US009182635B2

(12) United States Patent
Kurasawa

(10) Patent No.: US 9,182,635 B2
(45) Date of Patent: *Nov. 10, 2015

(54) LIQUID CRYSTAL DISPLAY DEVICE WITH LARGER CELL GAP FORMED OUTSIDE DISPLAY AREA

(71) Applicant: Japan Display Inc., Tokyo (JP)

(72) Inventor: Hayato Kurasawa, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,148

(22) Filed: Jan. 9, 2015

(65) Prior Publication Data

US 2015/0116647 A1 Apr. 30, 2015

Related U.S. Application Data

(63) Continuation of application No. 13/013,287, filed on Jan. 25, 2011, now Pat. No. 9,013,667.

(30) Foreign Application Priority Data

Jan. 29, 2010 (JP) .................................. 2010-017900

(51) Int. Cl.
*G02F 1/1339* (2006.01)
*G02F 1/1333* (2006.01)
*G02F 1/1341* (2006.01)

(52) U.S. Cl.
CPC ............ *G02F 1/1341* (2013.01); *G02F 1/1339* (2013.01); *G02F 1/133371* (2013.01); *G02F 2001/13415* (2013.01)

(58) Field of Classification Search
CPC .................. G02F 1/1339; G02F 1/341; G02F 2001/13415
USPC .................. 349/138, 153, 154, 189, 190, 192
See application file for complete search history.

(56) References Cited

U.S. PATENT DOCUMENTS

| | | |
|---|---|---|
| 4,976,516 A | 12/1990 | Carrington |
| 5,381,255 A | 1/1995 | Ohnuma et al. |
| 5,699,139 A | 12/1997 | Aastuen et al. |
| 5,946,070 A | 8/1999 | Kohama et al. |
| 5,978,065 A | 11/1999 | Kawasumi et al. |
| 6,124,917 A | 9/2000 | Fujioka et al. |

(Continued)

FOREIGN PATENT DOCUMENTS

| | | |
|---|---|---|
| CN | 1188246 | 7/1998 |
| JP | 10-186384 | 7/1998 |

(Continued)

OTHER PUBLICATIONS

Chinese Office Action issued May 26, 2014 in corresponding Chinese Patent Application No. 201110023720.6.

*Primary Examiner* — Paisley L Arendt
(74) *Attorney, Agent, or Firm* — K&L Gates LLP

(57) ABSTRACT

A liquid crystal display device includes: a pair of substrates that are bonded together with a sealing member having a closed loop shape that is formed around a display region with a space maintained from the display region; and a liquid crystal layer that is disposed between the pair of substrates so as to maintain a cell gap of a predetermined thickness, wherein, between the display region and the sealing member, a cell thick area, in which a cell gap larger than the cell gap of the display region is formed, is formed.

6 Claims, 11 Drawing Sheets

(56) References Cited

U.S. PATENT DOCUMENTS

| | | |
|---|---|---|
| 6,204,907 B1 | 3/2001 | Hiraishi et al. |
| 7,292,304 B2 | 11/2007 | Kim et al. |
| 7,535,538 B2 | 5/2009 | Yamada et al. |
| 7,567,334 B2 | 7/2009 | Kadotani |
| 7,898,631 B2 | 3/2011 | Yang |
| 8,120,743 B2 | 2/2012 | Katsumura et al. |
| 2001/0026348 A1 | 10/2001 | Murata et al. |
| 2008/0062374 A1 | 3/2008 | Katsumura et al. |

FOREIGN PATENT DOCUMENTS

| | | |
|---|---|---|
| JP | 2003-195318 | 7/2003 |
| JP | 3678974 | 5/2005 |
| JP | 2008-233720 | 10/2008 |

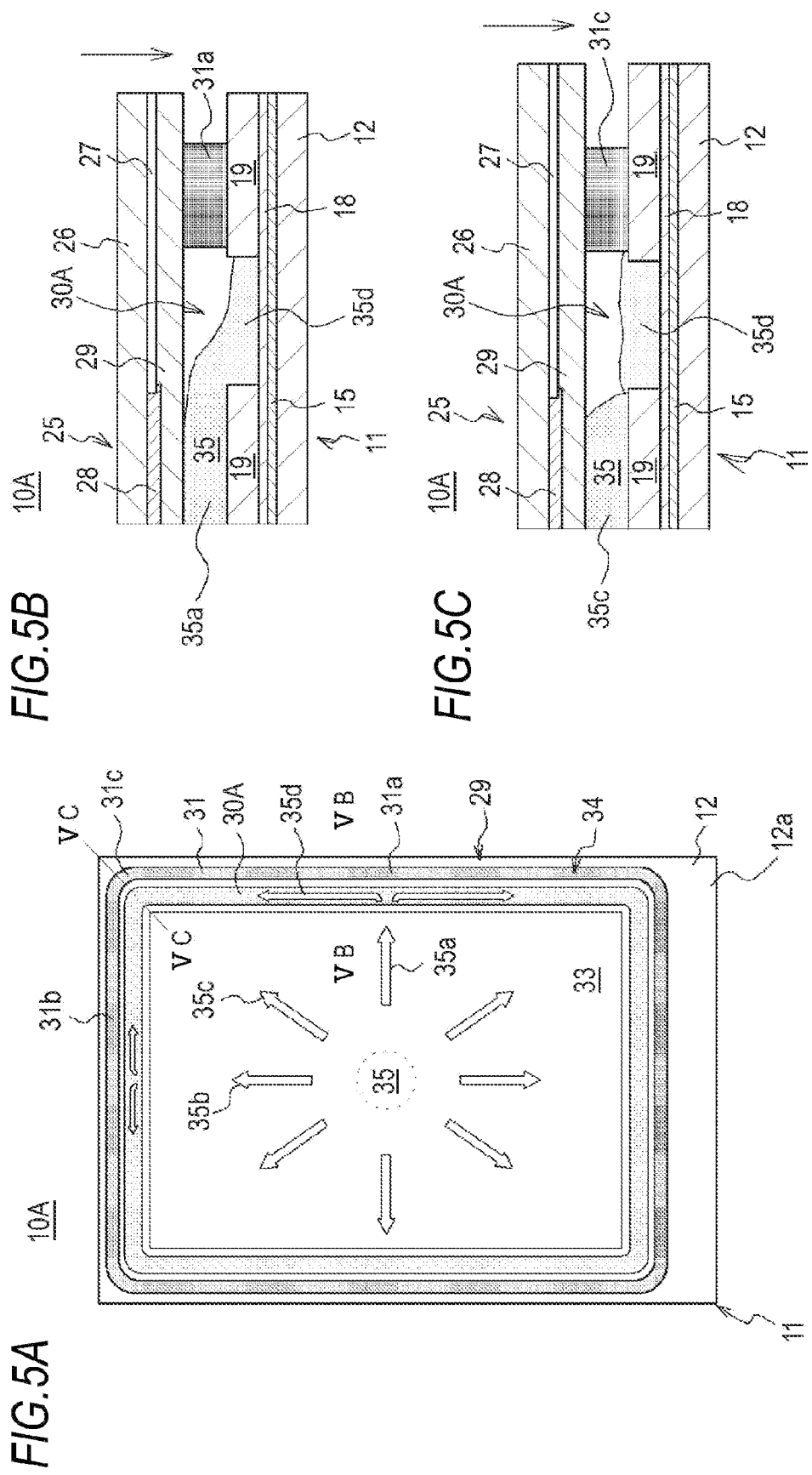

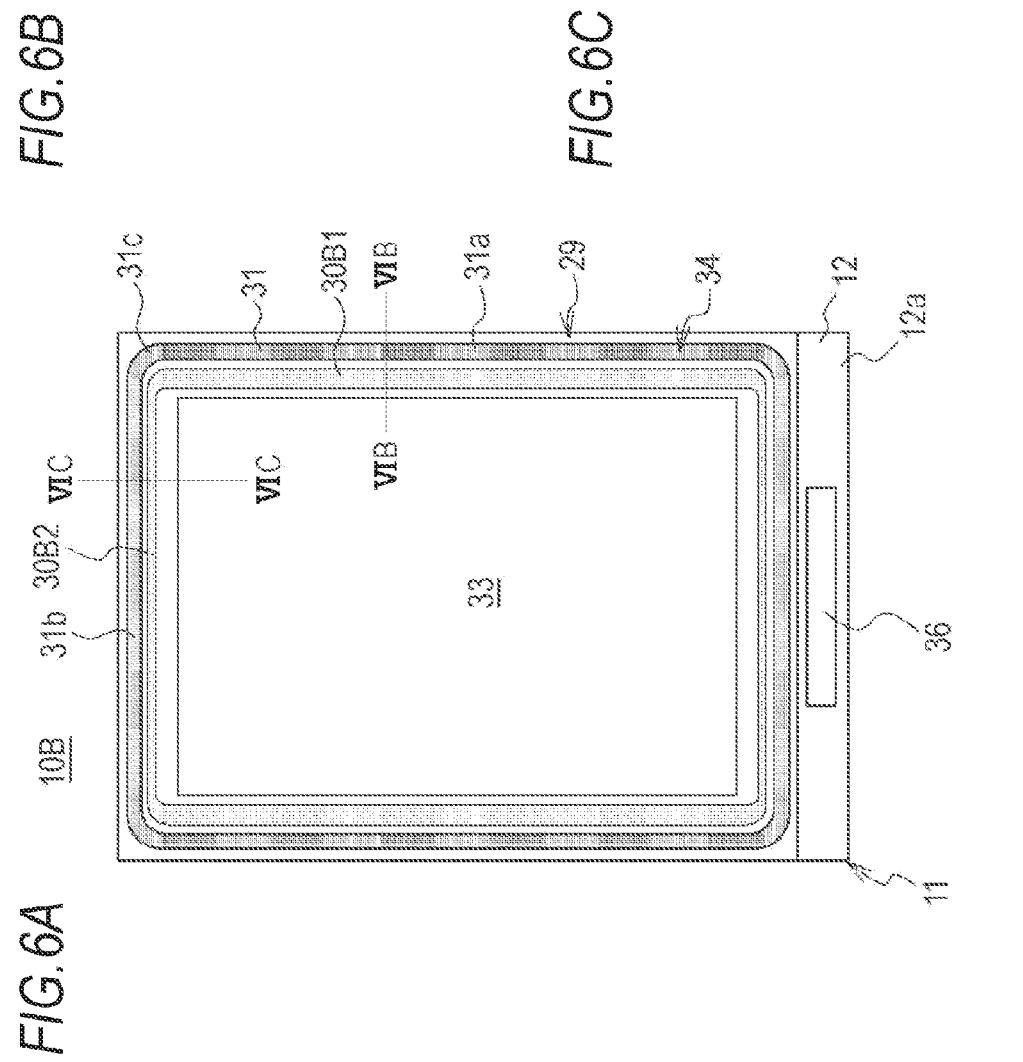

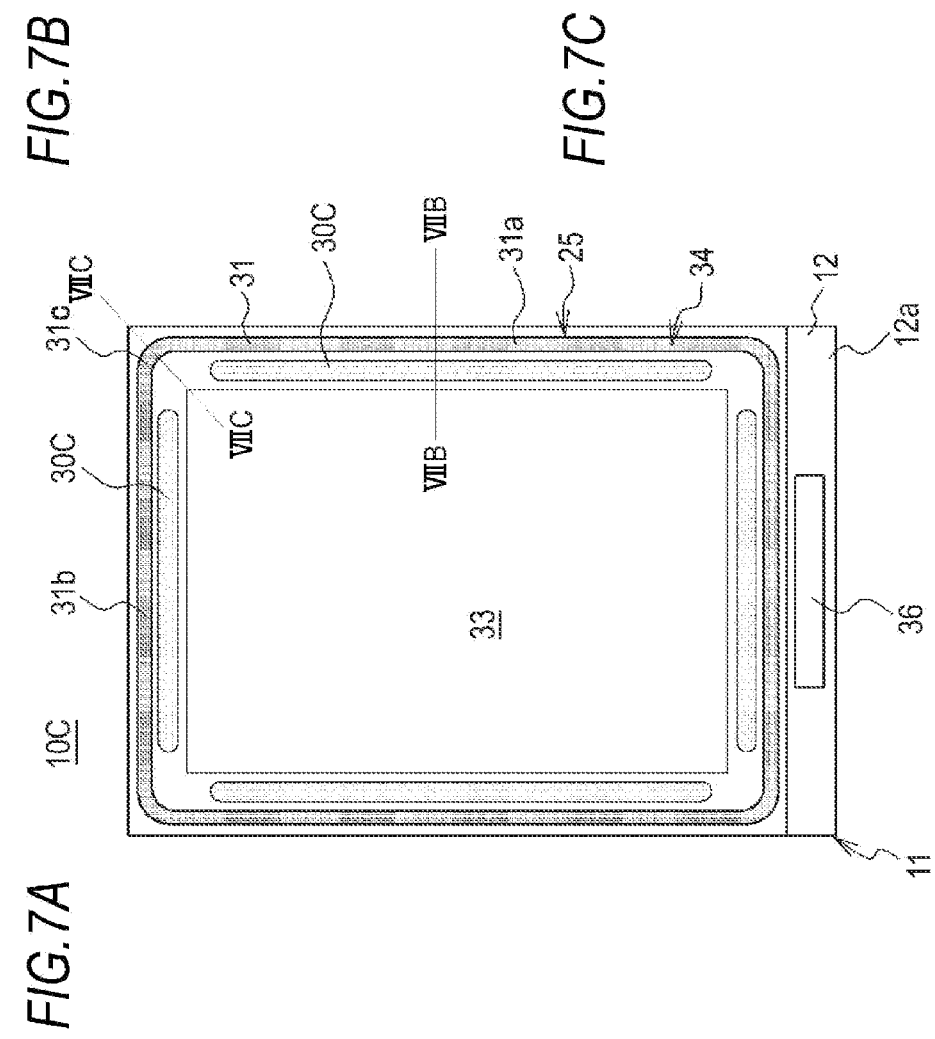

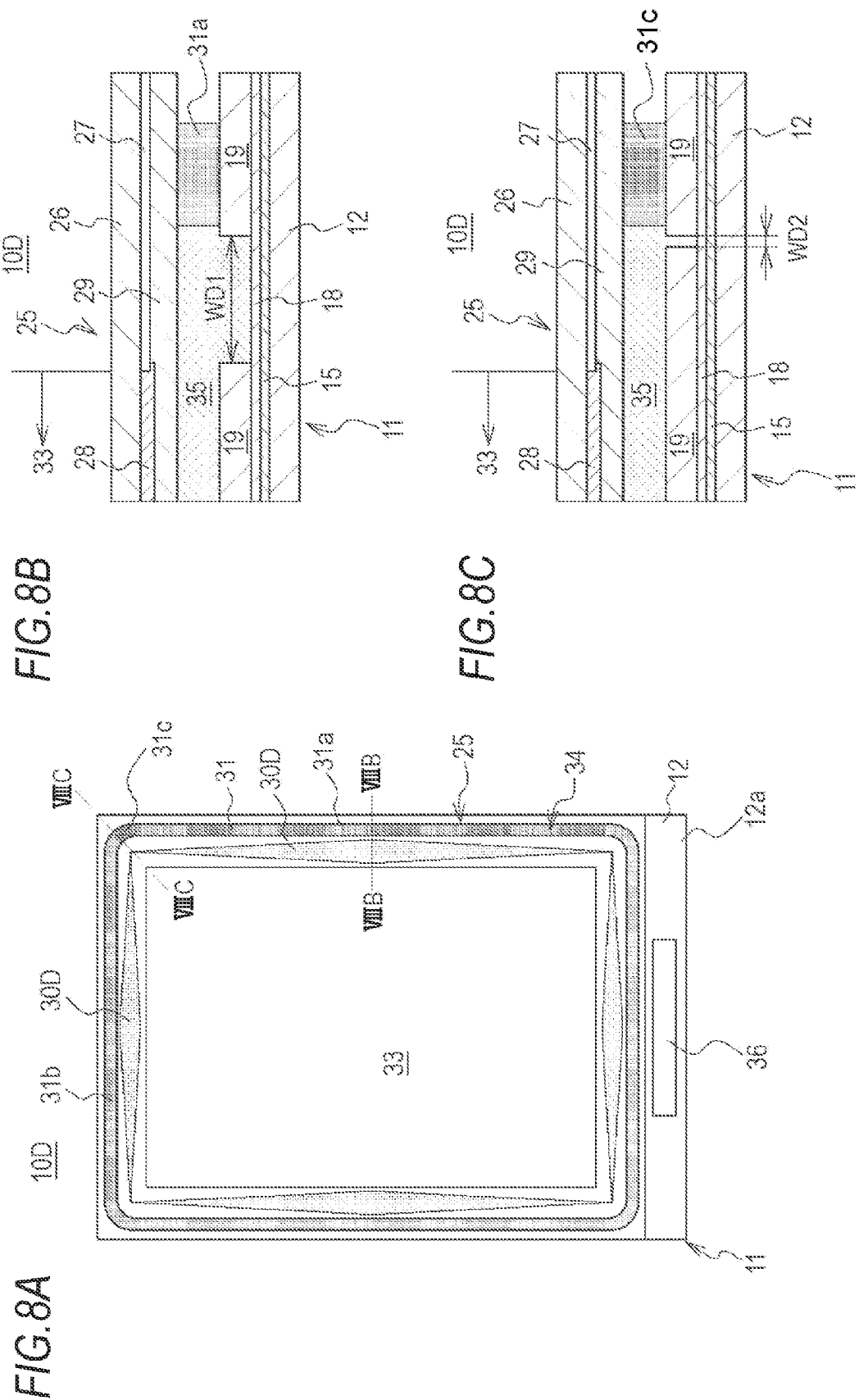

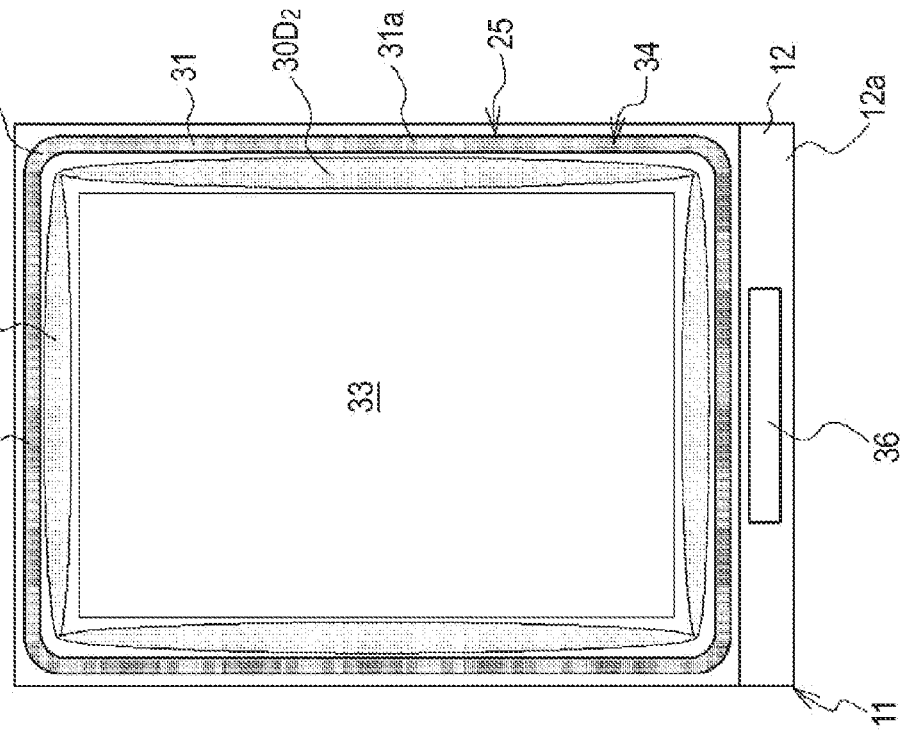
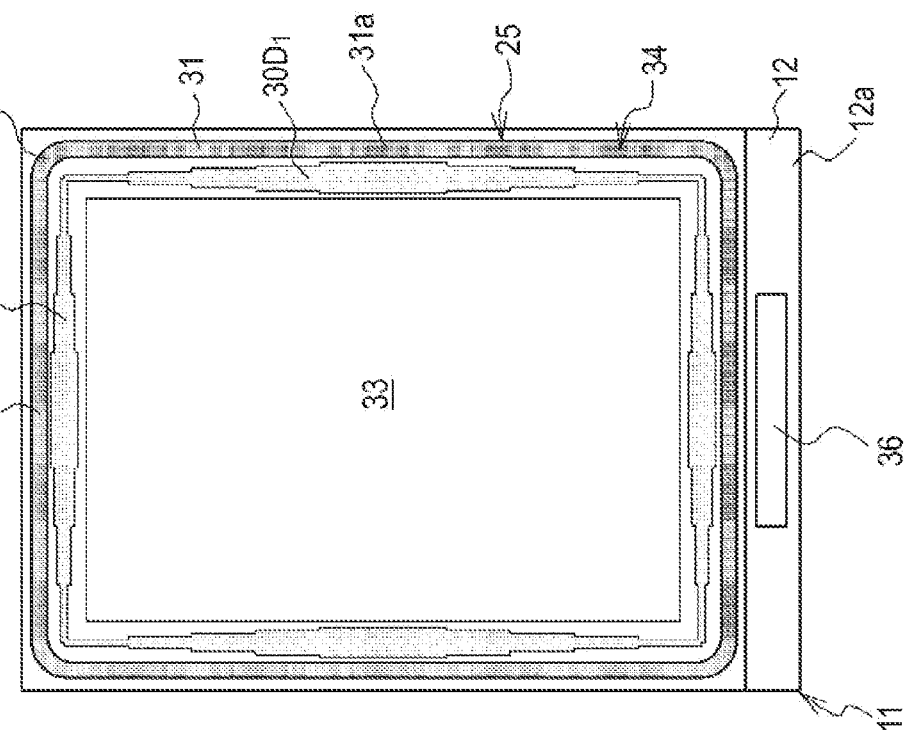

ard in that the liquid crystal in the sealing member positioned in the side portion is suppressed by lengthening the contact time, and the liquid crystal easily runs up on the corner portion of which a distance from the center portion of the display region is relatively long.

LIQUID CRYSTAL DISPLAY DEVICE WITH LARGER CELL GAP FORMED OUTSIDE DISPLAY AREA

CROSS REFERENCES TO RELATED APPLICATIONS

The present application is a continuation of U.S. patent application Ser. No. 13/013,287, filed Jan. 25, 2011, which application claims priority to Japanese Priority Patent Application JP 2010-017900 filed in the Japan Patent Office on Jan. 29, 2010, the entire contents of which is hereby incorporated by reference.

BACKGROUND

The present application relates to a liquid crystal display device manufactured by using a One Drop Fill (hereinafter, referred to as "ODF") method, and more particularly, to a liquid crystal display device suppressing insertion of liquid crystal into a sealing member and generation of air bubbles inside the liquid crystal.

As a method of enclosing liquid crystal in a liquid crystal display device, an ODF method is known. The ODF method is a method in which, before two substrates, for example, an array substrate and a color filter substrate, on which various wirings and the like are formed, are bonded together, any one of the substrates that is disposed on the lower side is coated with a sealing member in a closed loop shape, liquid crystal is dropped into the inside thereof, thereafter, the substrate is covered with the other substrate located on the upper side and bonded therewith, and the sealing member is cured by ultraviolet rays, heat, or the like.

In the ODF method, after coating is performed with the sealing member, the liquid crystal is injected, and thereafter a pair of substrates is bonded together. However, at this time, the sealing member is brought into contact with the liquid crystal in the state in which the sealing member is not cured. Since the liquid crystal is brought into contact with the sealing member for a long time, and pressure is applied thereto at the time of bonding the substrates together, the liquid crystal is inserted into the sealing member that is still in a soft state. Accordingly, there is a problem in that the liquid crystal finally passes through the sealing member so as to cause leakage of the liquid crystal.

On the other hand, a corner portion of the sealing member in the liquid crystal display device is relatively far from the center portion of the liquid crystal display device, compared to the side portion of the sealing member, and accordingly, the liquid crystal material is insufficient therein, and the liquid crystal does not sufficiently spread thereto. Therefore, there is a problem in that air bubbles are generated in a portion in which the amount of the liquid crystal is insufficient.

In order to solve such a problem, a method of manufacturing a liquid crystal display device capable of dropping the liquid crystal with a dropping amount optimized for each substrate is disclosed in Japanese Patent No. 3678974. In other words, according to the method of manufacturing a liquid crystal display device disclosed in Japanese Patent No. 3678974, in the method of manufacturing a liquid crystal display device in which liquid crystal is injected by dropping the liquid crystal onto a substrate, then disposing the liquid crystal dropping face of the substrate so as to face an opposing substrate and bonding the substrates together in vacuum, and returning the pressure to the atmospheric pressure, the optimized amount of the liquid crystal to be enclosed between the two substrates is predicted by measuring the columnar height of a columnar spacer installed so as to determine a cell thickness between the two substrates bonded together, and the amount of liquid crystal to be dropped is controlled based on the predicted value.

According to the method of manufacturing a liquid crystal display device using the ODF method disclosed in Japanese Patent No. 3678974, the amount of liquid crystal optimized for each liquid crystal display panel can be dropped. Accordingly, air bubbles due to an insufficient amount of liquid crystal or an uneven display due to an excessive amount of liquid crystal can be eliminated, whereby it is thought that the liquid crystal display device can be stably manufactured in massive volume.

SUMMARY

However, in the method of manufacturing a liquid crystal display device disclosed in Japanese Patent No. 3678974, in order to measure the columnar height of the columnar spacer, it is necessary to include a special device. Accordingly, there is a problem in that the manufacturing cost increases. In addition, a new process for the measurement is added, and accordingly, there is a problem in that the manufacturing efficiency decreases. Furthermore, the optimized amount of the liquid crystal may be incorrectly determined in accordance with the accuracy of the measurement of the columnar height of the columnar spacer.

In addition, in Japanese Patent No. 3678974 described above, a method of dropping the liquid crystal in a plurality of spots is disclosed. However, since the dropped liquid crystal spreads in an approximately concentric pattern, the liquid crystal quickly arrives at the side portions, which is the same as in the above-described case. In addition, in a case where the liquid crystal is dropped in a plurality of spots, the amount of the liquid crystal for each spot decreases. Therefore, there is a concern that the liquid crystal spread to the corner portion may be further insufficient, and accordingly, it is difficult to solve the above-described problems.

The inventors of the present application have performed various reviews for solving the above-described problems in related art and found that by disposing a groove between a display region and the sealing member, contact time between the liquid crystal and the sealing member can be shortened and by allowing the liquid crystal to flow through the groove, the liquid crystal can broadly spread even to corner portions into which it is difficult for the liquid crystal to spread, thereby completing the present application. Thus, the present application addresses a liquid crystal display device manufactured using an ODF method in which insertion of the liquid crystal into the sealing member is suppressed, and generation of air bubbles in corner portions is suppressed.

According to an embodiment, there is provided a liquid crystal display device including: a pair of substrates that are bonded together with a sealing member having a closed loop shape that is formed around a display region with a space maintained from the display region; and a liquid crystal layer that is disposed between the pair of substrates so as to maintain a cell gap of a predetermined thickness. Between the display region and the sealing member, a cell thick area, in which a cell gap larger than the cell gap of the display region is formed, is formed.

As a problem in the ODF technology in related art, the distances to the side portion and the corner portion of the sealing member from the center portion of the display region are different from each other. Accordingly, the liquid crystal arrives at the side portion in a short time, and the contact time in the side portion is lengthened. Therefore, there is a disadvantage that the liquid crystal is inserted into the sealing member. On the other hand, there is a disadvantage that the liquid crystal is insufficient in the corner portion of the sealing member so as to generate air bubbles in the display region.

According to the above-described liquid crystal display device, between the display region and the sealing member, the cell thick area, in which a cell gap larger than the cell gap of the display region is formed, is formed. Accordingly, at the time of the ODF bonding process, when the liquid crystal spreading from the center portion of the display region arrives at the side portion of the sealing member, the liquid crystal flows into the cell thick area formed in the portion, and accordingly, the contact time between the liquid crystal and the sealing member can be shortened. Therefore, insertion of the liquid crystal into the sealing member can be suppressed. In addition, as the liquid crystal flowed into the side portion moves along the cell thick area to the corner portion to which it is difficult for the liquid crystal to spread, a sufficient amount of the liquid crystal can arrive at the corner portion of the sealing member. Therefore, generation of air bubbles due to an insufficient amount of the liquid crystal can be suppressed.

In the above-described liquid crystal display device, the display region may have a rectangular shape.

Generally, in a liquid crystal display device having a rectangular shape, the center portion is disposed relatively far from the corner portion, and accordingly, the above-described problem appears the most remarkably. However, according to the above-described liquid crystal display device, the liquid crystal in the corner portion of the liquid crystal display device in which the display region has a rectangular shape is suppressed from being insufficient. Accordingly, a liquid crystal display device suppressing generation of air bubbles due to an insufficient amount of the liquid crystal can be provided.

In addition, in the above-described liquid crystal display device, the cell thick area may be formed so as to have a broad width on the side of a longer side of the sealing member and have a narrow width on the side of a shorter side of the sealing member.

Generally, the sealing member located on the side of the longer side is closer to the center portion of the display region than the sealing member located on the side of the shorter side. Accordingly, the liquid crystal arrives at the sealing member located on the side of the longer side in a short time, whereby insertion of the liquid crystal into the sealing member may easily occur. Thus, according to the above-described liquid crystal display device, the width of the cell thick area located on the side of the longer side is formed to be relatively broad, and the width of the cell thick area located on the side of the shorter side is formed to be relatively narrow. Thus, according to the above-described liquid crystal display device, it takes time for the liquid crystal spreading to the side of the longer side to arrive at the sealing member side through the cell thick area having the broad width, whereby the insertion of the liquid crystal into the sealing member can be suppressed. In addition, by changing the size of the cell thick area in accordance with the distance to the display region from the center portion, the insertion can be efficiently suppressed, and it becomes easier for the liquid crystal to arrive at the corner portion, whereby generation of air bubbles inside the liquid crystal layer can be suppressed.

In the above-described liquid crystal display device, it is preferable that the cell thick area is formed except for a corner portion of the sealing member.

According to the above-described liquid crystal display device, the cell thick area is formed only in the side portion of the sealing member in which insertion of the liquid crystal may easily occur. Accordingly, while insertion of the liquid crystal into the sealing member is suppressed, in the corner portion in which the cell thick area is not formed, the liquid crystal easily spreads up to the corner portion with the liquid crystal spreading along the cell thick area and the liquid crystal spreading along the substrate surface on which the cell thick area is not formed, whereby the generation of air bubbles can be further suppressed.

In the above-described liquid crystal display device, the cell thick area may have a largest width in a portion that is closest to a center portion of the display region and a smallest width in a portion that is farthest from the center portion and be formed so as to change continuously or intermittently in accordance with a distance from the display region.

According to the above-described liquid crystal display device, the width, in which the cell thick area is formed, is formed so as to be changed in accordance with the distance from the center portion of the display region. Accordingly, the width of the cell thick area located in the center portion of the side of each side at which the liquid crystal arrives in the shortest time is formed to be the broadest, and the cell thick area of the corner portion at which the liquid crystal arrives in the longest time is formed to be the narrowest. Thus, according to the above-described liquid crystal display device, insertion of the liquid crystal into the sealing member can be efficiently suppressed, and generation of air bubbles in the corner portion can be suppressed. Furthermore, the width of the cell thick area may be changed by the longer side portion and the shorter side portion of each side in accordance with the liquid crystal display device to be manufactured.

In the above-described liquid crystal display device, the cell gap of the cell thick area may be formed so as to sequentially increase from the display region side toward the sealing member side.

When the cell gap of the cell thick area is formed so as to sequentially increase from the display region side toward the sealing member side, the liquid crystal can spread to the cell thick area more easily. Thus, according to the above-described liquid crystal display device, a liquid crystal display device can be acquired in which it is difficult for the liquid crystal to be inserted into the sealing member and the amount of air bubble generated inside the liquid crystal is a little.

In the above-described liquid crystal display device, it is preferable that the cell thick area is formed from a groove that is formed in a resin layer formed between the display region of one or both of the pair of substrates and the sealing member.

According to the above-described liquid crystal display device, the cell thick area can be formed by forming a groove in the resin layer that is generally formed. Accordingly, the cell thick area can be formed without using a special manufacturing process or a special material, whereby a liquid crystal display device can be provided at low price.

In the above-described liquid crystal display device, the cell thick area may be formed on at least one of the pair of substrates.

According to the above-described liquid crystal display device, it is preferable to form the cell thick area on a substrate that is disposed on the lower side at the time of dropping the liquid crystal, accordingly, substrates of various liquid crystal display devices to be manufactured can be responded. In addition, by forming the cell thick area on both substrates of a pair of the substrates, the liquid crystal arriving at the sealing member can be increased through the cell thick area formed on both the substrates when the substrates are bonded together. Accordingly, the insertion of the liquid crystal into the sealing member and the generation of air bubbles in the corner portion can be suppressed further. In addition, since the shape of the cell thick area formed for each substrate of a pair of the substrates can be changed, the time or the speed at which the liquid crystal spreads can be controlled by the shape of the cell thick area. Therefore, the degree of freedom in design can be increased in accordance with the size or the shape of the liquid crystal display device.

Additional features and advantages are described herein, and will be apparent from the following Detailed Description and the figures.

BRIEF DESCRIPTION OF THE FIGURES

FIG. 5A is a schematic plan view showing the process of spreading liquid crystal to a liquid crystal display device of Embodiment 1.

FIG. 5B is a cross-sectional view taken along line VB-VB shown in FIG. 5A.

FIG. 5C is a cross-sectional view taken along line VC-VC shown in FIG. 5A.

FIG. 6A is a plan view of a liquid crystal display device according to Embodiment 2.

FIG. 6B is a cross-sectional view taken along line VIB-VIB shown in FIG. 6A.

FIG. 6C is a cross-sectional view taken along line VIC-VIC shown in FIG. 6A.

FIG. 7A is a plan view of a liquid crystal display device according to Embodiment 3.

FIG. 7B is a cross-sectional view taken along line VIIB-VIIB shown in FIG. 7A.

FIG. 7C is a cross-sectional view taken along line VIIC-VIIC shown in FIG. 7A.

FIG. 8A is a plan view of a liquid crystal display device according to Embodiment 4.

FIG. 8B is a cross-sectional view taken along line VIIIB-VIIIB shown in FIG. 8A.

FIG. 8C is a cross-sectional view taken along line VIIIC-VIIIC shown in FIG. 8A.

FIGS. 9A and 9B are plan views showing other configurations of the liquid crystal display device according to Embodiment 4.

DETAILED DESCRIPTION

Figure 1:
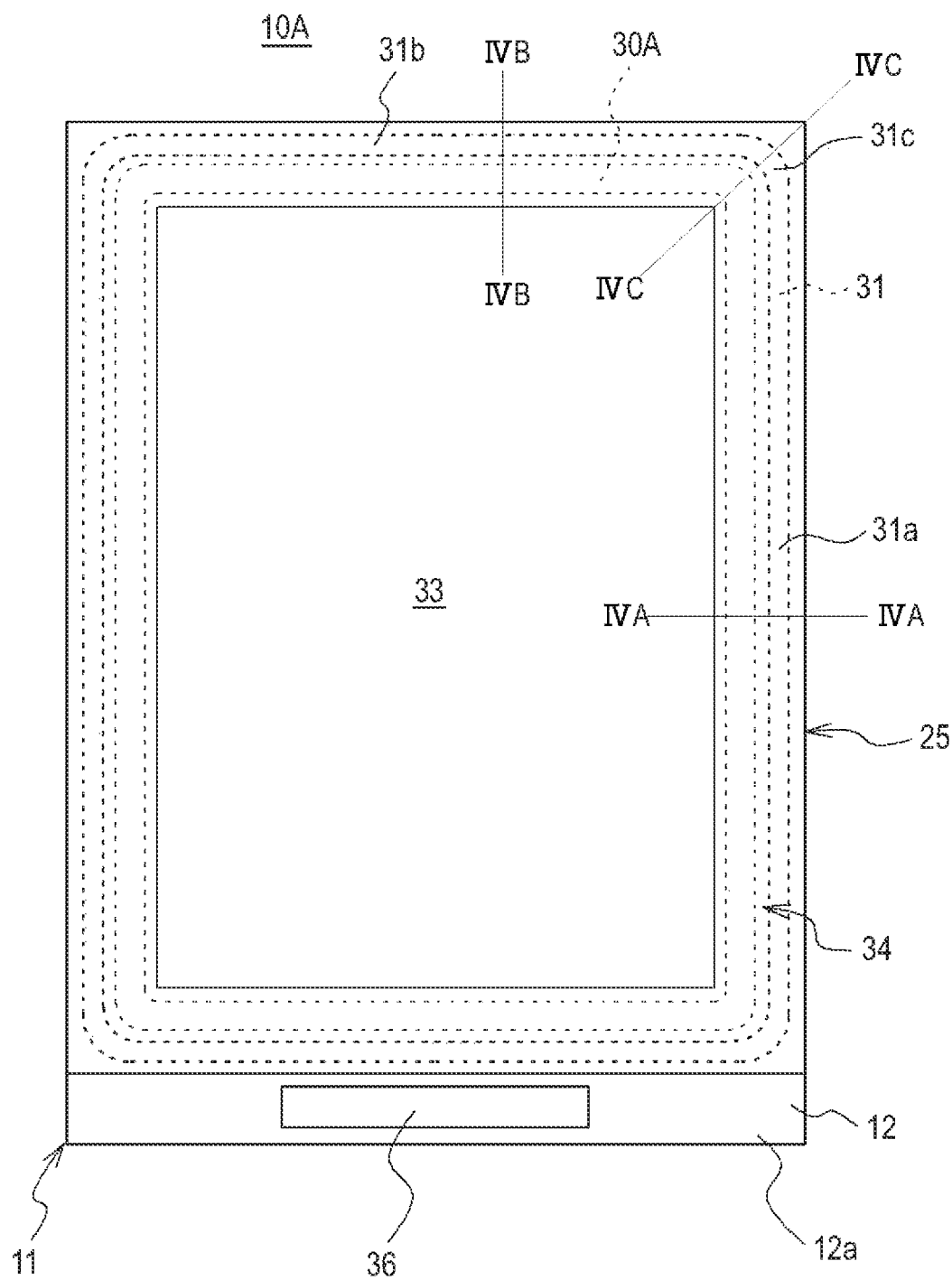
FIG. 1 is a plan view of a liquid crystal display device of Embodiment 1 of the present application.

Embodiments of the present application will be described below in detail with reference to the drawings.

However, in the embodiments described below, liquid crystal display devices for embodying the technical idea of embodiments are described as examples. The embodiments are not for the purpose of limiting the application to the liquid crystal display devices, and other embodiments within the scope of the present application can be implemented in the same manner. In the drawings used for the description here, in order to scale each layer or each member so as to be recognizable in the drawings, the layers and members are represented in different scales, and thus the layers and the members are not represented in proportion to the actual sizes thereof.

The "surface" of the array substrate or the color filter substrate described below represents a surface on which various wirings are formed. The liquid crystal display device according to an embodiment may be a so-called vertical electric field-type liquid crystal display device that is driven in a TN (Twisted Nematic) mode, a VA (Vertical Alignment) mode, or an MVA (Multi-domain Vertical Alignment) mode or a horizontal electric field-type liquid crystal display device such as an IPS (In-Plane Switching) mode or an FFS (Fringe Field Switching) mode. However, the liquid crystal display device of each embodiment will be described as being represented by a liquid crystal display device of the FFS mode.

Embodiment 1

First, the configuration of a liquid crystal display device 10A according to Embodiment 1 will be described with reference to FIG. 1. As shown in FIG. 1, in the liquid crystal display device 10A of Embodiment 1, an array substrate 11 (it corresponds to "one substrate" according to the embodiment) in which various wirings and the like are formed on the first transparent substrate 12 formed from rectangular glass or the like and a color filter substrate 25 (it corresponds to "the other substrate" according to the embodiment) in which a color filter layer and the like are formed on the second transparent substrate 26 formed from rectangular glass or the like are disposed so as to face each other. Then, the array substrate 11 and the color filter substrate 25 are bonded together by a sealing member 31, and a liquid crystal 35 (see FIG. 3) is enclosed inside a space that is formed by the sealing member 31. In addition, an area (an area contributing to display) inside an area surrounded by the sealing member 31 in which a plurality of sub pixel regions 32, to be described later, are formed becomes a display region 33, and an area outside the display region 33 becomes a non-display region 34 (also termed a "frame region").

In addition, the array substrate 11 having a size slightly larger than that of the color filter substrate 25 is used so as to form an overhanging portion with a predetermined space when being disposed so as to face the color filter substrate 25. This overhanging portion becomes a mounting area 12a in which a driver IC 36 for driving the liquid crystal 35 and the like are disposed. Since the liquid crystal display device 10A according to Embodiment 1 is manufactured by using an ODF method, a liquid crystal injecting opening is not formed. In addition, between the display region 33 of the array substrate 11 and the sealing member 31, a cell thick area 30A having a cell gap G2 (see FIGS. 4A to 4C) larger than a cell gap G1 between the substrates in the display region 33 is formed. This cell thick area 30A will be described in detail later.

Next, the configurations of the array substrate 11 and the color filter substrate 25 will be described with reference to FIGS. 2 to 4C. First, in the array substrate 11, a plurality of scanning lines 13, for example, formed from a wiring of two layers of Mo/Al are formed on the surface of the first transparent substrate 12 so as to be parallel to one another. In addition, the entire surface of the first transparent substrate 12 on which the scanning lines 13 are formed is coated with a gate insulating film 15 formed from a transparent insulating material such as silicon nitride or silicon oxide. Then, in an area in which a thin film transistor (TFT) 17 as a switching device is formed, a semiconductor layer 16, for example, formed from an amorphous silicon layer is formed on the surface of the gate insulating film 15. The area of the scanning line 13 located at a position at which the semiconductor layer 16 is formed forms a gate electrode G of the TFT 17.

In addition, on the surface of the gate insulating film 15, a signal line 14 including a source electrode S, for example, formed from a conductive layer having a structure of three layers of Mo/Al/Mo and a drain electrode D are formed. Both the source electrode S portion of the signal line 14 and the drain electrode D portion partially overlap with the surface of the semiconductor layer 16. In addition, the entire surface of the array substrate 11 is coated with a passivation film 18 that is formed from a transparent insulating material such as silicon nitride or silicon oxide. Furthermore, the entire surface of the passivation film 18 is coated with an interlayer film 19, for example, formed from a resin material, and in the passivation film 18 and the interlayer film 19 at a position corresponding to the drain electrode D, a contact hole 24 is formed. In the interlayer film 19, a groove portion 19a is formed in which the interlayer film 19 is not formed between the sealing member 31, to be described later, and the display region 33 (see FIGS. 4A to 4C).

Figure 2:
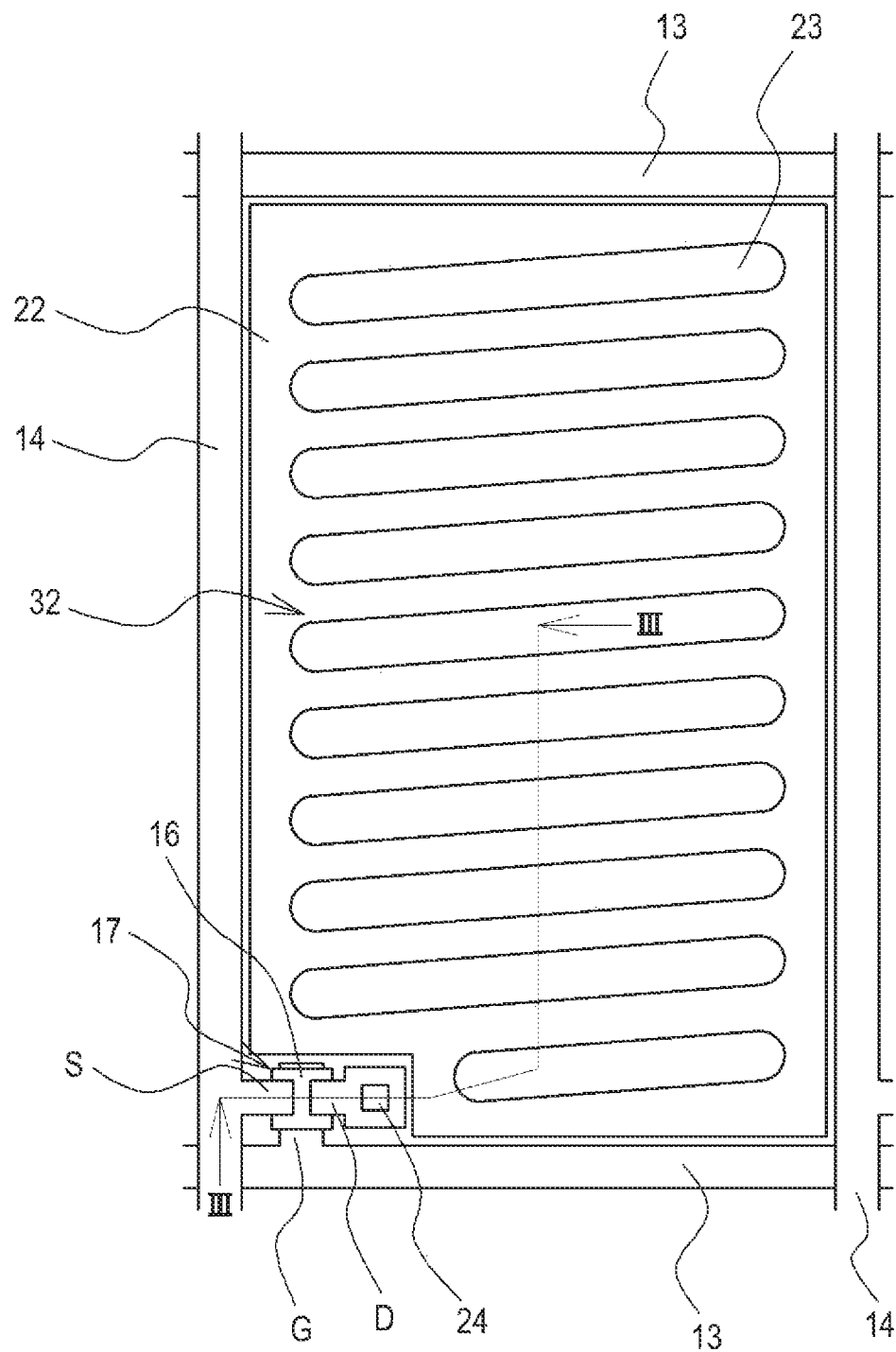
FIG. 2 is an enlarged plan view of one sub pixel represented by seeing through a color filter substrate of a liquid crystal display device of Embodiment 1.

Then, in order to form the pattern shown in FIG. 2, a lower electrode 20 is formed with a transparent conductive material, for example, formed from ITO (Indium Tin Oxide) or IZO (Indium Zinc Oxide) on the interlayer film 19 in the area (hereinafter, referred to as a "sub pixel region 32") surrounded by the scanning lines 13 and the signal lines 14. This lower electrode 20 is electrically connected to the drain electrode D through the contact hole 24. Thus, the lower electrode 20 operates as a pixel electrode. In addition, on the lower electrode 20, an inter-electrode insulating film 21 is formed. As the material of the inter-electrode insulating film 21, a transparent insulating material having a good insulating property such as silicon nitride is used.

On the inter-electrode insulating film 21, a plurality of upper electrodes 22, for example, having bar-shaped slits 23 in the plan view are formed in the sub pixel region 32 with a transparent conductive material formed from ITO or IZO. These upper electrodes 22 are formed to extend along the entirety of the display region 33 and are electrically connected to a common wiring (not shown in the figure) in a non-display region 34. Accordingly, the upper electrodes 22 serve as a common electrode. Thereafter, by disposing an alignment film (not shown in the figure) in the entirety of the surface including the upper electrodes 22 of the display region 33, the array substrate 11 of the liquid crystal display device 10A according to Embodiment 1 is formed.

Figure 4A:
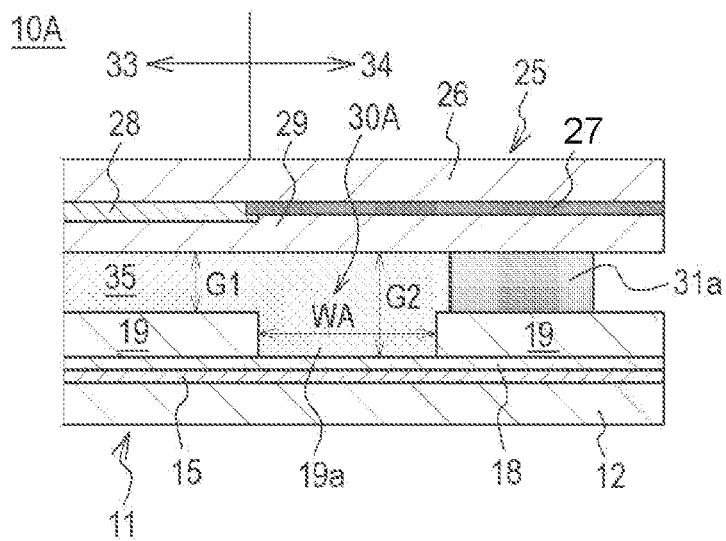
FIG. 4A is a cross-sectional view taken along line IVA-IVA shown in FIG. 1.
Figure 4B:
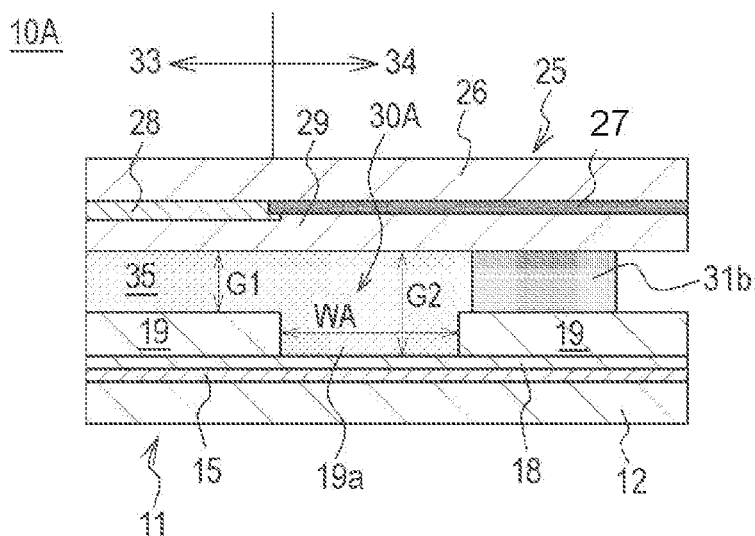
FIG. 4B is a cross-sectional view taken along line IVB-IVB shown in FIG. 1.
Figure 4C:
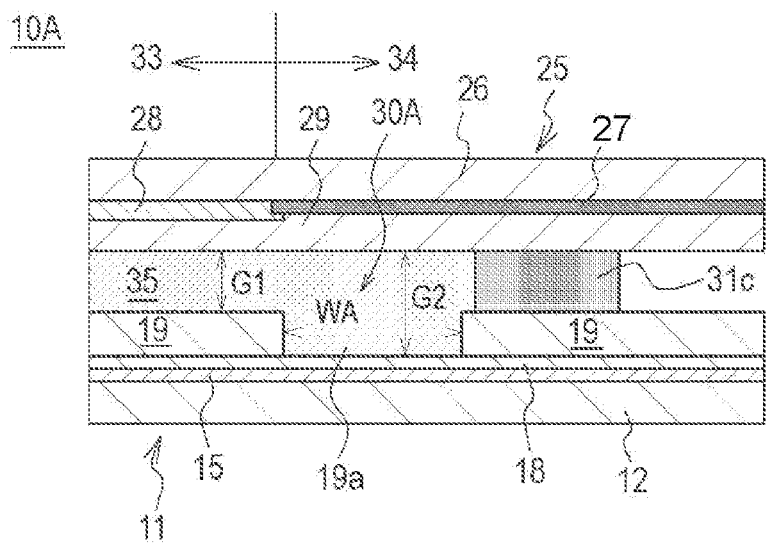
FIG. 4C is a cross-sectional view taken along line IVC-IVC shown in FIG. 1.

At this time, as shown in FIGS. 4A to 4C, in the array substrate 11, the cell thick area 30A is formed in which the groove portion 19a, in which the above-described interlayer film 19 is not formed, has a cell gap G2 larger than the cell gap G1 in the display region 33. In addition, in the liquid crystal display device 10A according to Embodiment 1, as shown in FIGS. 4A to 4C, the depths G2 and the widths WA of the cell thick areas 30A that are formed in a longer side portion 31a, a shorter side portion 31b, and a corner portion 31c of the sealing member 31 are configured to be the same. In FIGS. 4A to 4C, the first electrode, the inter-electrode insulating film, and the second electrode that are formed on the array substrate are omitted.

Figure 3:
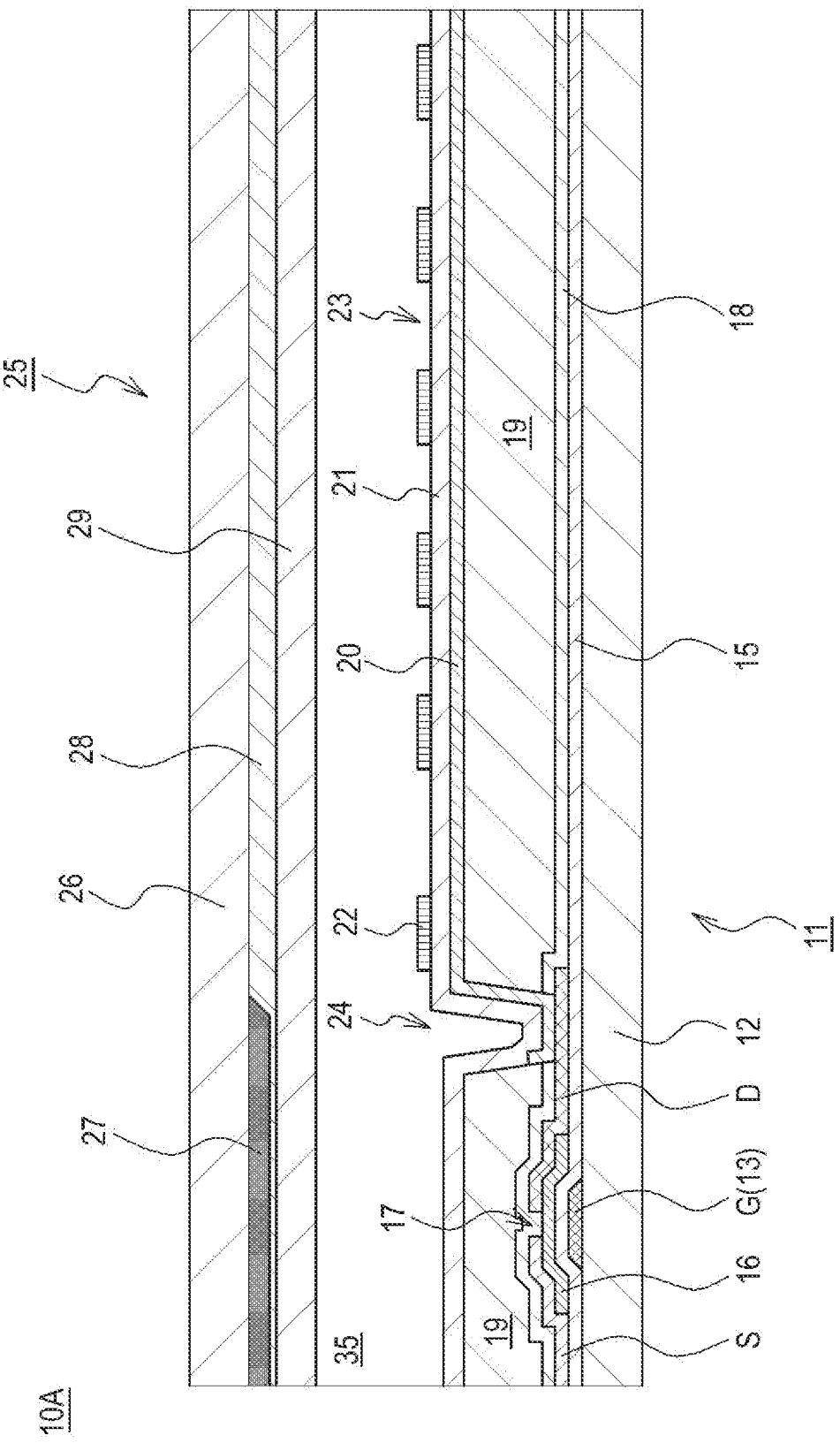
FIG. 3 is a cross-sectional view taken along line III-III shown in FIG. 2.

Next, in the color filter substrate 25, as shown in FIG. 3, on the surface of the second transparent substrate 26 formed from a glass substrate or the like, the light shielding layer 27 is formed so as to coat positions corresponding to the scanning line 13, the signal line 14, and the TFT 17 of the array substrate 11 and the non-display region 34. Then, on the surface of the second transparent substrate 26 on which the light shielding layer 27 is formed, a color filter layer 28 that is formed from a plurality of colors, for example, three colors of red, green, and blue is formed. In addition, an overcoat layer 29 formed from a transparent resin is formed so as to coat the surfaces of the light shielding layer 27 and the color filter layer 28. On the surface of the overcoat layer 29, an alignment film (not shown in the figure) is formed in the entirety of the surface of the color filter substrate 25. In addition, on the outer faces of the array substrate 11 and the color filter substrate 25, polarizing plates (not shown in the figure) are disposed.

The sealing member 31 is drawn on the array substrate 11 by using a dedicated seal dispenser. In the liquid crystal display device 10A according to Embodiment 1, any liquid crystal injecting opening is not formed. Thus, coating is made with the sealing member 31 in a closed loop shape (see FIG. 1). After drawing of the sealing member 31 is completed, the liquid crystal 35 is dropped by using an ODF method, the color filter substrate 25 is superimposed on the array substrate 11 so as to apply pressure thereon, and the sealing member 31 is cured by ultraviolet rays, heat, or the like, whereby both the substrates 11 and 25 are bonded together. Although the sealing member 31 has been described as being drawn on the array substrate 11, the sealing member 31 may be drawn on the color filter substrate 25. In addition, the substrate onto which the liquid crystal is dropped is not necessarily the substrate on which the sealing member 31 is drawn. Thus, it may be configured that the liquid crystal is dropped onto a substrate located on a side opposite to the substrate on which the sealing member 31 is drawn, and both the substrates are bonded together. However, it is more effective that the liquid crystal is dropped onto a substrate forming the cell thick area 30A that is a feature of the embodiment.

Next, the advantage of Embodiment 1 owing to the formation of the cell thick area 30A on the array substrate 11 at a time when coating is made with the liquid crystal 35 and the substrates are bonded together will be described in comparison with a general example with reference to FIGS. 4A to 4C, FIGS. 5A to 5C, and FIGS. 11A to 11C. Here, a difference between a liquid crystal display device 10' as a general example shown in FIGS. 11A to 11C and the liquid crystal display device 10A of Embodiment 1 is that the cell thick area is not formed in the liquid crystal display device 10'. Thus, the same reference numeral is assigned to common parts other than that, and detailed description thereof will be omitted.

Figures 11A, 11B, 11C:
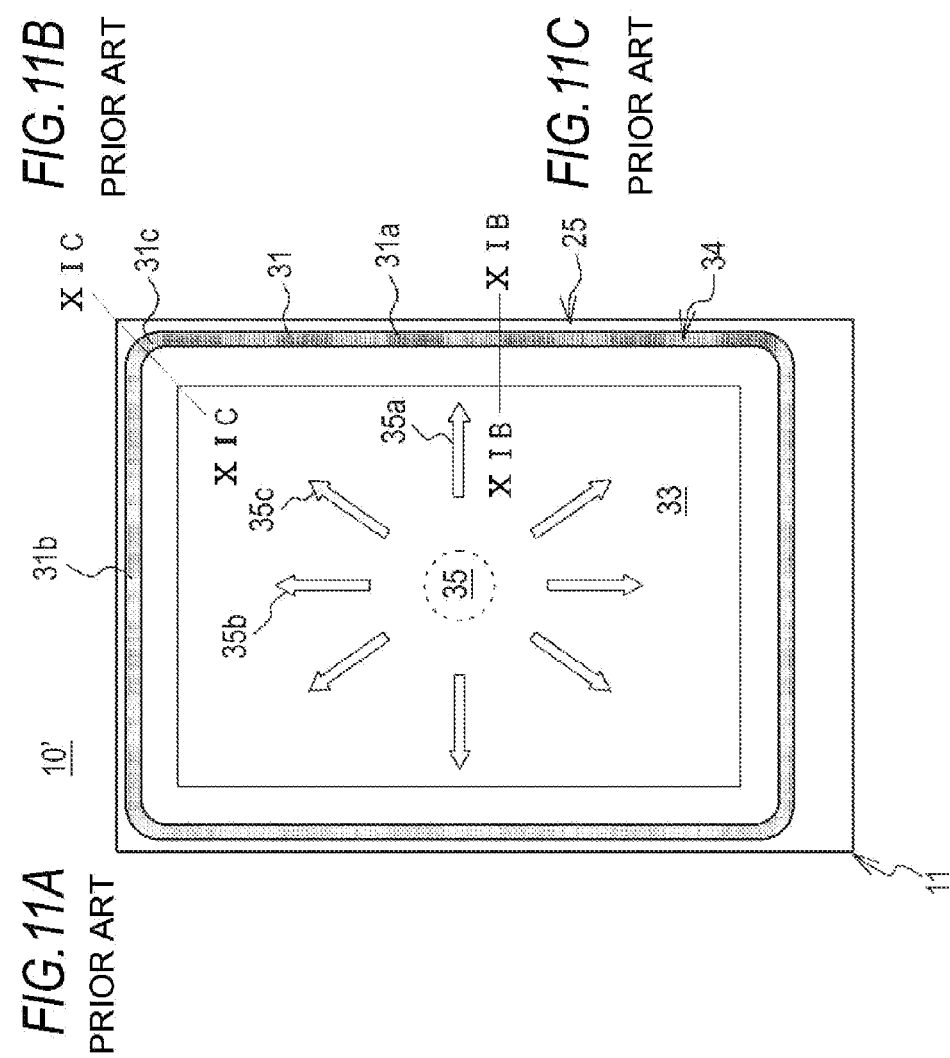
FIG. 11A is a schematic plan view showing the process of spreading liquid crystal to a liquid crystal display device of an example in related art.
FIG. 11B is a cross-sectional view taken along line XIB-XIB shown in FIG. 11A.
FIG. 11C is a cross-sectional view taken along line XIC-XIC shown in FIG. 11A.

As shown in FIG. 11A, in a case where the liquid crystal 35 is dropped onto the general liquid crystal display device 10' by using the ODF method and is sealed, distances from the center portion of the display region 33 to the side portions 31a and 31b and the corner portion 31c of the sealing member 31 are different from each other. Accordingly, the liquid crystals 35a and 35b arrive at the side portions 31a and 31b in a short time. In addition, this tendency is particularly remarkable in the longer side portion 31a. Furthermore, in a case where the ODF method is used, the sealing member 31 is brought into contact with the liquid crystal 35 in an uncured state. Accordingly, as shown in FIG. 11B, a time during which the liquid crystal 35 and the sealing member 31 are brought into contact with each other is lengthened. Thus, when the pressure at the time of bonding is applied, the liquid crystal 35' may be inserted into the sealing member 31 so as to break the sealing member 31, whereby leakage of the liquid crystal may occur.

On the other hand, since a distance to the corner portion 31c of the sealing member 31 is long, as shown in FIG. 11C, a time until the liquid crystal 35c arrives at the corner portion 31c is necessary. Accordingly, since there is no sufficient amount of the liquid crystal 35, there is a portion that is not filled with the liquid crystal 35. Thus, air bubbles 37 may be generated in the portion. Since the substrates 11 and 25 are bonded together after injection of the liquid crystal 35 using the ODF method inside the device in a vacuum state, the air bubbles 37 are generated in a portion that is not filled with the liquid crystal when bonding is completed and the pressure is returned to the atmospheric pressure, that is, the corner portion. These air bubbles 37 may move when the liquid crystal display device is tilted or accelerated, and the retention of the air bubbles in the display region 33 causes a defective display.

Thus, in the liquid crystal display device 10A of Embodiment 1, as shown in FIGS. 4A to 4C and 5A to 5C, the cell thick area 30A is formed between the sealing member 31 and the display region 33. In the array substrate shown in FIGS. 5A to 5C, the first electrode, the inter-electrode insulating film, and the second electrode are not shown in the figure.

According to the liquid crystal display device 10A of Embodiment 1, in a case where bonding is performed after dropping the liquid crystal 35 using the ODF method, as shown in FIG. 5A, the liquid crystal 35a arrives at the longer side portion 31a of the sealing member 31 in a short time, similarly to a general example. At this time, since the cell thick area 30A is formed in the liquid crystal display device 10A of Embodiment 1, as shown in FIG. 5B, the liquid crystal 35a flows into the cell thick area 30A. Accordingly, time is necessary until the liquid crystal is brought into contact with the sealing member 31, whereby prolonged contact between the liquid crystal and the sealing member 31 is suppressed. In addition, since the cell thick area 30A is formed along the sealing member 31 forming a coat in the closed loop shape, as shown in FIGS. 5A and 5C, the liquid crystal 35 flowed into the cell thick area 30A spreads along the cell thick area 30A and arrives at the corner portion 31c. Accordingly, the corner portion 31c, into which it is difficult for the liquid crystal 35 to spread in related art, is filled up with a sufficient amount of the liquid crystal 35 by the liquid crystal 35c spreading on the display region 33 and the liquid crystal 35d spreading along the cell thick area 30A, whereby generation of air bubbles due to an insufficient amount of liquid crystal can be suppressed (see FIGS. 4A and 4B).

Then, after the bonding of the array substrate 11 and the color filter substrate 25 is completed, the driver Dr and the like are disposed in the mounting area 12a of the array substrate 11, whereby the liquid crystal display device 10 according to Embodiment 1 is formed.

As above, according to the liquid crystal display device 10A of Embodiment 1, by forming the cell thick area 30A between the display region 33 and the sealing member 31, the liquid crystal display device can be provided in which insertion of the liquid crystal 35 into the sealing member 31 at the time of bonding using the ODF method and generation of air bubbles in the corner portion, into which it is difficult for the liquid crystal 35 to spread, are suppressed.

In addition, since the liquid crystal display device of Embodiment 1 has a rectangular shape, the liquid crystal in the corner portions of the liquid crystal display device having a rectangular display region 33 is suppressed from being insufficient, whereby a liquid crystal display device suppressing generation of air bubbles can be provided. In this embodiment, the display region 33 is represented as having a rectangular shape. However, the display region may have a shape such as a circular shape or a horseshoe shape. Particularly, a shape such as a horseshoe shape partially having a corner portion can be used very effectively.

In addition, the cell thick area 30A formed in the liquid crystal display device of Embodiment 1 is formed by forming a groove in the interlayer film 19 (resin film) that is formed in a general array substrate. Accordingly, the cell thick area 30A can be formed without using a special manufacturing process or a special material, whereby a liquid crystal display device can be provided at a low price.

Embodiment 2

Next, a liquid crystal display device 10B according to Embodiment 2 will be described with reference to FIGS. 6A to 6C. Only the formation pattern of a cell thick area 30B of the liquid crystal display device 10B according to Embodiment 2 is different from that of the liquid crystal display device 10A according to Embodiment 1. Thus, the same reference numerals are assigned to the same configuration as that of the liquid crystal display device 10A according to Embodiment 1, and detailed description thereof will be omitted.

In the liquid crystal display device 10B of Embodiment 2, as shown in FIGS. 6A to 6C, the width WB1 of the cell thick area 30B1 on the side of the longer side portion 31a of the sealing member is formed to be relatively broad, and the width WB2 of the cell thick area 30B2 on the side of the shorter side portion 31b of the sealing member is formed to be relatively narrow.

The liquid crystal 35, as described above, quickly arrives at the side of the side of the sealing member 31. However, particularly, the side of the longer side portion 31a of the sealing member is closer to the center portion of the display region 33 than the side of the shorter side portion 31b, and accordingly, the liquid crystal 35 can be easily inserted into the sealing member 31. Thus, according to the liquid crystal display device 10B of Embodiment 2, it takes a long time for the liquid crystal 35a spreading to the side of the longer side portion 31a to arrive at the sealing member 31 due to the cell thick area 30B1 having a broad width. Accordingly, insertion of the liquid crystal 35 into the sealing member 31 can be suppressed. In addition, it takes a longer time for the liquid crystal 35b spreading to the side of the shorter side portion 31b to arrive at the sealing member than that spreading to the side of the longer side portion 31a, but it takes a shorter time for the liquid crystal 35b to arrive at the sealing member than that spreading to the corner portion 31c. Accordingly, by forming the cell thick area 30B2 having a narrow width on the side of the shorter side portion 31b, the liquid crystal 35 can effectively spread to the side of the shorter side portion 31b. In addition, by allowing the liquid crystal to flow into the cell thick area 30B2 having a narrow width while insertion of the liquid crystal is suppressed by shortening the contact time between the liquid crystal 35 and the sealing member 31, the liquid crystal 35 can effectively spread to the corner portion 31c, whereby generation of air bubbles can be suppressed.

Embodiment 3

Next, a liquid crystal display device 10C according to Embodiment 3 will be described with reference to FIGS. 7A to 7C. Only the formation pattern of a cell thick area of the liquid crystal display device 10C according to Embodiment 3 is different from that of the liquid crystal display device 10A according to Embodiment 1. Thus, the same reference numerals are assigned to the same configuration as that of the liquid crystal display device 10A according to Embodiment 1, and detailed description thereof will be omitted.

In the liquid crystal display device 10C of Embodiment 3, as shown in FIGS. 7A to 7C, the cell thick area 30C is formed only in the side portions 31a and 31b of the sealing member 31 formed on the array substrate 11 except for the corner portion 31c thereof.

By employing such a configuration, according to the liquid crystal display device 10C of Embodiment 3, the cell thick area 30C is formed only in the side portions 31a and 31b of the sealing member 31 in which insertion of the liquid crystal 35 can easily occur. Accordingly, similarly to the above-described Embodiment 1, insertion of the liquid crystal 35 into the sealing member 31 can be suppressed. In addition, in the corner portion 31c in which the cell thick area is not formed, the liquid crystal does not flow into the cell thick area, and accordingly, the liquid crystal 35 can spread without any waste. Thus, owing to the liquid crystal 35 spreading along the cell thick area 30C formed in the side portions 31a and 31b and the liquid crystal 35 spreading along the substrate surface in which the cell thick area is not formed in the corner portion 31c, the liquid crystal 35 can easily arrive at the corner portion 31c, whereby generation of the air bubbles can be further suppressed.

In addition, the width of the cell thick area 30C in the shorter side portion of the liquid crystal display device of Embodiment 3 may be formed to be smaller than that of the cell thick area in the longer side portion. In such a case, the advantages of Embodiment 2 of the present application also can be acquired.

Embodiment 4

Next, a liquid crystal display device 10D according to Embodiment 4 will be described with reference to FIGS. 8A to 8C. Only the formation pattern of a cell thick area of the liquid crystal display device 10D according to Embodiment 4 is different from that of the liquid crystal display device 10A according to Embodiment 1. Thus, the same reference numerals are assigned to the same configuration as that of the liquid crystal display device 10A according to Embodiment 1, and detailed description thereof will be omitted.

In the cell thick area 30D of the liquid crystal display device 10D of Embodiment 4, as shown in FIGS. 8A to 8C, the width WD1 of a portion located closest to the center portion of the display region 33 is the largest, and the width WD2 of a portion located farthest from the center portion is the smallest. Thus, the cell thick area 30D is formed in a so-called "diamond shape" in the plan view in which the width continuously changes in accordance with the distance from the display region 33. By employing such a configuration, the width of the cell thick area 30D in the center portion on the side of the side portions 31a and 31b at which the liquid crystal 35 arrives in a shortest time is formed to be the broadest, and the cell thick area 30D in the corner portion 31c at which the liquid crystal 35 arrives in a longest time is formed to be the smallest.

Thus, according to the liquid crystal display device 10D of Embodiment 4, insertion of the liquid crystal 35 into the sealing member 31 can be effectively suppressed in accordance with the manner in which the liquid crystal 35 spreads. In addition, in the corner portion 31c, since the width of the cell thick area 30D is formed to be the narrowest, the liquid crystal 35 spreads on the substrate, and the liquid crystal 35 can spread from the cell thick area 30D in the side portions 31a and 31b. Accordingly, the corner portion 31c can be sufficiently filled up with the liquid crystal 35, whereby generation of air bubbles can be suppressed in the corner portion 31c. Furthermore, the width of the cell thick area can be changed by the longer side portions and the shorter side portions of the sides in accordance with the shape of the liquid crystal display device to be manufactured.

In addition, the shape of the cell thick area 30D of the liquid crystal display device of Embodiment 4 may not be continuous, and a cell thick area $30D_1$ that is intermittent as represented in the liquid crystal display device $10D_1$ shown in FIG. 9A may be used. Furthermore, a cell thick area $30D_2$ having an oval shape as represented in the liquid crystal display device $10D_2$ shown in FIG. 9B may be used.

Embodiment 5

Figure 10A:
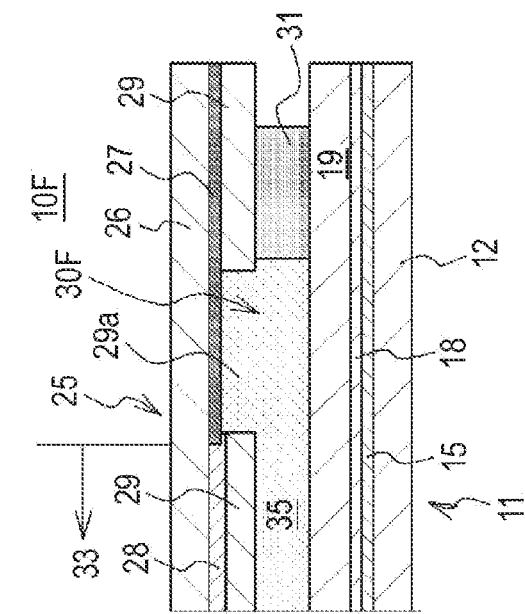
FIG. 10A is a cross-sectional view of a liquid crystal display device according to Embodiment 5, which corresponds to FIG. 4A.
Figure 10C:
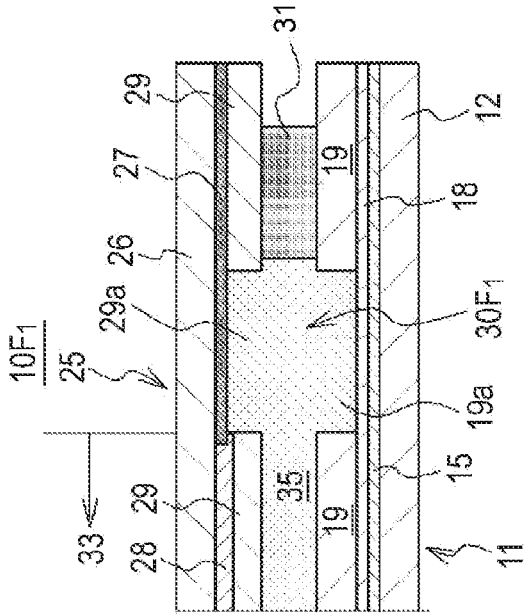
FIG. 10C is a cross-sectional view of a liquid crystal display device according to Embodiment 6, which corresponds to FIG. 4A.
Figure 10B:
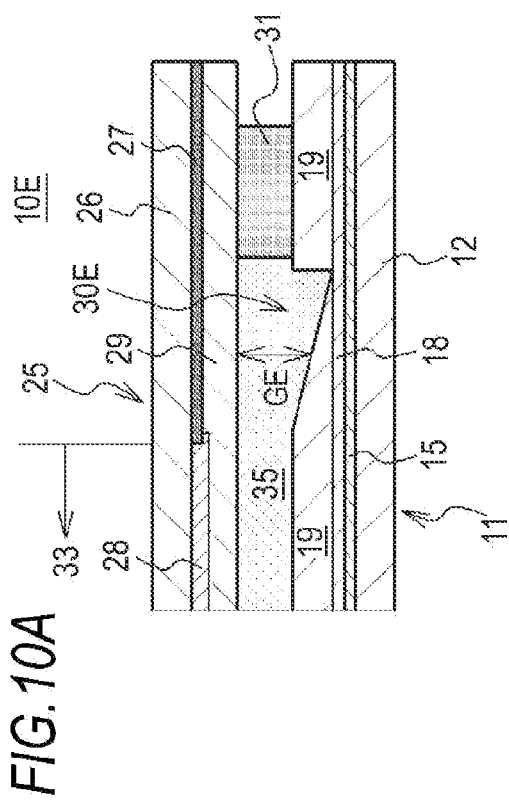
FIG. 10B is a cross-sectional view of another configuration of the liquid crystal display device according to Embodiment 5.

Next, a liquid crystal display device 10E according to Embodiment 5 will be described with reference to FIGS. 10A and 10B. Only the formation pattern of a cell thick area 30E of the liquid crystal display device 10E according to Embodiment 5 is different from that of the liquid crystal display device 10A according to Embodiment 1. Thus, the same reference numerals are assigned to the same configuration as that of the liquid crystal display device 10A according to Embodiment 1, and detailed description thereof will be omitted.

In the liquid crystal display device 10E of Embodiment 5, the cell gap GE of the cell thick area 30E is formed in a tilted shape so as to sequentially increase from the display region 33 side toward the sealing member 31 side. By employing such a configuration, the liquid crystal 35 can easily spread in the cell thick area 30E. Accordingly, the efficiency of supply of the liquid crystal 35 to the corner portion 31c can increase. In addition, this shape may be a cell gap $GE_1$ so as to form a gentle curve shape as in the cell thick area $30E_1$ as represented in the liquid crystal display device $10E_1$ shown in FIG. 9B.

Embodiment 6

Next, a liquid crystal display device 10F according to Embodiment 6 will be described with reference to FIGS. 10C and 10D. While the cell thick area of the liquid crystal display device 10A of Embodiment 1 is formed on the array substrate, a cell thick area of a liquid crystal display device 10F of Embodiment 6 is formed on the color filter substrate. The other configurations are common to those of the liquid crystal display device 10A of Embodiment 1. Thus, the same reference numerals are assigned to the same configuration as that of the liquid crystal display device 10A according to Embodiment 1, and detailed description thereof will be omitted.

In the liquid crystal display device 10F of Embodiment 6, a cell thick area 30F is formed on a color filter substrate 25. The cell thick area 30F can be formed by arranging a groove portion 29a in an overcoat layer 29 that is formed on the color filter substrate 25. According to the liquid crystal display device 10F of Embodiment 6, the color filter substrate 25 located on the lower side can be used when the liquid crystal 35 is dropped. Accordingly, a substrate used for various liquid crystal display devices can be responded.

Figure 10D:
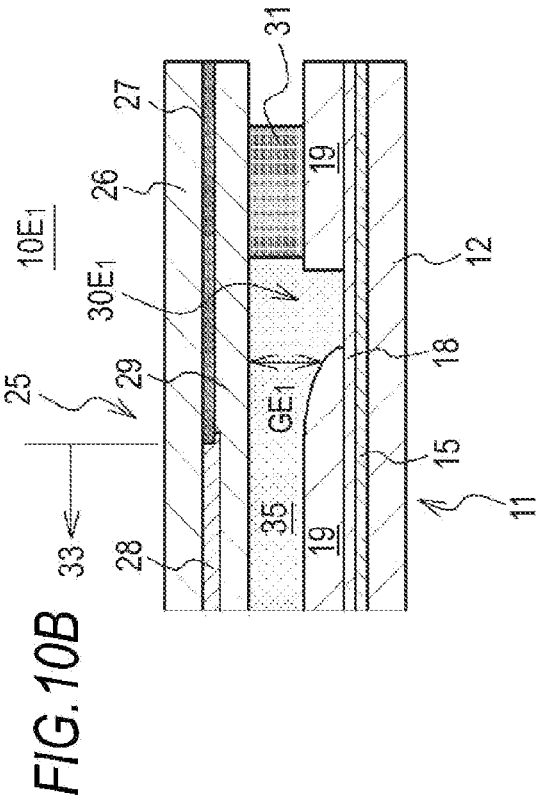
FIG. 10D is a cross-sectional view of another configuration of the liquid crystal display device according to Embodiment 6.

Furthermore, by forming the cell thick area $30F_1$ on both substrates 11 and 25 forming a pair as shown in FIG. 10D, the liquid crystal 35 that arrives at the sealing member 31 can be increased by the cell thick area $30F_1$ formed on both the substrates when the both substrates are bonded together. Accordingly, the insertion of the liquid crystal into the sealing member 31 and generation of air bubbles in the corner portion 31c can be suppressed further.

In addition, the shape of the cell thick area formed on each of the substrates forming a pair can be changed. Accordingly, the time and the speed at which the liquid crystal spreads can be controlled by the shape of the cell thick area. Therefore, the degree of freedom in design can be increased in accordance with the size and the shape of the liquid crystal display device.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A liquid crystal display device comprising:
a pair of substrates bonded together;
an interlayer film formed on an entire surface except for a recessed portion of one of the pair of substrates;
a sealing member formed outside of the recessed portion, the sealing member being formed between the substrates around a display region with a space maintained from the display region, and the sealing member being formed between the interlayer film and the other of the pair of substrates;
a liquid crystal layer disposed between the pair of substrates; and
a cell thick area formed between the display region and the sealing member,
wherein a cell gap in the cell thick area is defined by the recessed portion of the interlayer film and one of the pair of substrates,
wherein the cell gap in the cell thick area is larger than the cell gap between the pair of substrates in the display region, and
wherein the cell thick area is formed so as to have a larger single substantially uniform width on a side of a longer side of the sealing member than a single substantially uniform width on a side of a shorter side of the sealing member.

2. The liquid crystal display device according to claim 1, wherein the cell thick area is formed except for a corner portion of the sealing member.

3. The liquid crystal display device according to claim 1, wherein the cell gap of the cell thick area is formed so as to sequentially increase from a display region side toward a sealing member side.

4. A liquid crystal display device comprising:
a pair of substrates bonded together;
an interlayer film formed on an entire surface except for a recessed portion of one of the pair of substrates;
a sealing member formed outside of the recessed portion, the sealing member being formed between the substrates around a display region with a space maintained from the display region, and the sealing member being formed between the interlayer film and the other of the pair of substrates;
a liquid crystal layer disposed between the pair of substrates; and
a cell thick area formed between the display region and the sealing member,
wherein a cell gap in the cell thick area is defined by the recessed portion of the interlayer film and one of the pair of substrates,
wherein the cell gap in the cell thick area is larger than the cell gap between the pair of substrates in the display region,
wherein the cell thick area has a largest width in a portion that is closest to the center portion of the display region and a smallest width in a portion that is farthest from the center portion and is formed so as to change continuously or discontinuously in accordance with a distance from the center portion of the display region, and
wherein the cell thick area is formed in a diamond shape or oval shape in a plan view.

5. The liquid crystal display device according to claim 4, wherein the cell thick area is formed except for a corner portion of the sealing member.

6. The liquid crystal display device according to claim 4, wherein the cell gap of the cell thick area is formed so as to sequentially increase from a display region side toward a sealing member side.

* * * * *